(12) United States Patent
Cuypers et al.

(10) Patent No.: US 9,366,578 B2
(45) Date of Patent: Jun. 14, 2016

(54) SENSOR ARRANGEMENT FOR THE MEASURING OF PARAMETERS IN MELTED MATERIAL

(75) Inventors: Jan Cuypers, Kermt (BE); Valère Indeherberge, Zonhoven (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 321 days.

(21) Appl. No.: 13/985,402

(22) PCT Filed: Jan. 24, 2012

(86) PCT No.: PCT/EP2012/000303
§ 371 (c)(1),
(2), (4) Date: Aug. 14, 2013

(87) PCT Pub. No.: WO2012/113498
PCT Pub. Date: Aug. 30, 2012

(65) Prior Publication Data
US 2013/0322489 A1 Dec. 5, 2013

(30) Foreign Application Priority Data

Feb. 23, 2011 (DE) .......................... 10 2011 012 175

(51) Int. Cl.
*G01K 1/08* (2006.01)
*G01K 13/00* (2006.01)
(Continued)

(52) U.S. Cl.
CPC ............... *G01K 13/00* (2013.01); *B22D 2/006* (2013.01); *G01J 5/004* (2013.01); *G01J 5/0255* (2013.01); *G01J 5/042* (2013.01); *G01J 5/0818* (2013.01); *G01J 5/0821* (2013.01); *G01J 5/0887* (2013.01)

(58) Field of Classification Search
CPC ........... G01K 1/08; G01K 1/14; G01K 13/00; G01J 5/08

USPC ......... 374/120, 130, 131, 163, 179, 208, 141, 374/139, 140, 159; 73/866.5; 356/43
See application file for complete search history.

(56) References Cited

U.S. PATENT DOCUMENTS 3,773,641 A * 11/1973 Fitterer .............. G01N 27/4118
204/423
4,428,686 A * 1/1984 Brax ........................ G01K 1/14
136/230
(Continued)

FOREIGN PATENT DOCUMENTS

DE 44 33 685 A1 3/1996
DE 10331124 B3 2/2005
(Continued)

OTHER PUBLICATIONS

Int'l Search Report and Written Opinion issued Jun. 27, 2012 in Int'l Application No. PCT/EP2012/000303.
(Continued)

*Primary Examiner* — Gail Kaplan Verbitsky
(74) *Attorney, Agent, or Firm* — Panitch Schwarze Belisario & Nadel LLP

(57) ABSTRACT

A sensor arrangement for melted materials includes an upper part and a detachable lower part. A tube extends coaxial to a longitudinal axis of the lower part, is closed on its end facing away from the upper part, and is open on the other end. The tube is arranged on an immersion end of the lower part facing away from the upper part. A guide tube, extending coaxial to a longitudinal axis of the upper part and being open on both ends, is arranged in a guide sleeve. A pressure acting in the direction of the lower part is applied to the guide tube by an elastic body and the guide tube touches against the lower part. One opening of the guide tube and the open end of the tube of the lower part are arranged adjacent to each other and coaxial to the longitudinal axis of the lower part.

19 Claims, 3 Drawing Sheets

(51) Int. Cl.
*B22D 2/00* (2006.01)
*G01J 5/00* (2006.01)
*G01J 5/08* (2006.01)
*G01J 5/04* (2006.01)
*G01J 5/02* (2006.01)

(56) References Cited

U.S. PATENT DOCUMENTS

| | | | | |
|---|---|---|---|---|
| 4,444,990 A * | 4/1984 | Villar | G01K 7/04 | 136/221 |
| 4,528,849 A * | 7/1985 | Paschkis | G01D 11/10 | 374/140 |
| 4,614,443 A * | 9/1986 | Hamert | G01K 1/146 | 136/221 |
| 4,626,643 A * | 12/1986 | Minet | G01K 1/146 | 219/516 |
| 4,852,451 A * | 8/1989 | Rogers | F42B 33/0285 | 73/149 |
| 4,896,549 A * | 1/1990 | Falk | G01N 1/125 | 374/140 |
| 4,964,736 A * | 10/1990 | Cure | G01N 33/206 | 136/234 |
| 5,415,052 A * | 5/1995 | Baerts | G01N 1/125 | 73/864.51 |
| 5,601,365 A * | 2/1997 | Li | B29C 65/3656 | 374/121 |
| 5,632,557 A * | 5/1997 | Simons | G01K 1/08 | 374/148 |
| 5,662,418 A * | 9/1997 | Deak | G01K 13/02 | 374/144 |
| 5,752,772 A | 5/1998 | Verstreken et al. | | |
| 6,299,349 B1 * | 10/2001 | Steinel | B29C 45/77 | 374/143 |
| 7,272,983 B2 * | 9/2007 | Caderas | F15B 15/261 | 73/866.5 |
| 7,635,220 B2 | 12/2009 | Dams et al. | | |
| 7,950,848 B2 * | 5/2011 | Kimura | F04D 29/0413 | 374/100 |
| 7,998,399 B2 * | 8/2011 | Dams | G01N 33/206 | 266/78 |
| 8,047,054 B2 * | 11/2011 | Below | F01N 13/008 | 73/28.01 |
| 8,684,598 B2 * | 4/2014 | Hoßbach | G01K 1/08 | 136/200 |
| 8,764,289 B2 * | 7/2014 | Parsons | G01K 1/14 | 374/179 |
| 2002/0163955 A1 * | 11/2002 | Yu | G01K 13/002 | 374/208 |
| 2004/0258130 A1 * | 12/2004 | Gotthold | G01K 11/3213 | 374/208 |
| 2005/0152433 A1 * | 7/2005 | Howard | G01K 13/02 | 374/208 |
| 2005/0175065 A1 | 8/2005 | Coleman | | |
| 2005/0279183 A1 | 12/2005 | Neyens et al. | | |
| 2009/0110026 A1 * | 4/2009 | Midash | G01K 1/08 | 374/139 |
| 2010/0139364 A1 * | 6/2010 | Kume | G01N 27/4077 | 73/23.31 |
| 2011/0292968 A1 * | 12/2011 | Ho ach | G01K 1/08 | 374/179 |
| 2012/0048039 A1 * | 3/2012 | Qiu | G06F 3/03545 | 73/866.5 |
| 2013/0163637 A1 * | 6/2013 | Parsons | G01K 1/14 | 374/179 |
| 2014/0334523 A1 * | 11/2014 | Lin | G01K 1/08 | 374/179 |

FOREIGN PATENT DOCUMENTS

| | | |
|---|---|---|
| EP | 0703026 A1 | 3/1996 |
| EP | 1 034 419 A1 | 9/2000 |
| EP | 1564536 A1 | 8/2005 |
| EP | 1614758 A2 | 1/2006 |
| GB | 1643228 A1 * | 4/2006 |
| JP | H07-229791 A | 8/1995 |
| JP | H07-318433 A | 12/1995 |
| WO | 9928726 A1 | 6/1999 |

OTHER PUBLICATIONS

Office Action issued Jan. 19, 2012 in DE Application No. 10 2011 012 175.7.

* cited by examiner

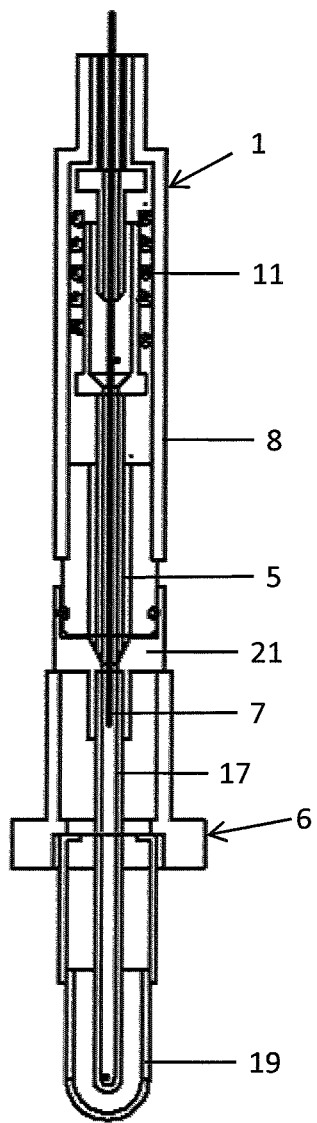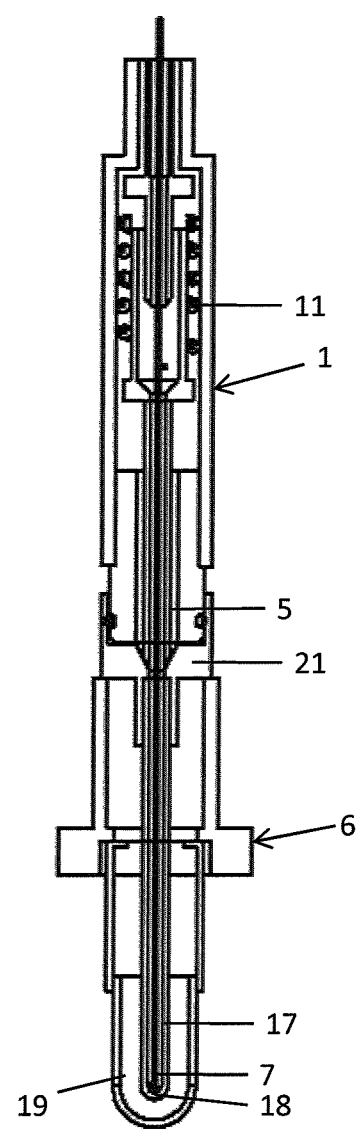
Fig. 3
Fig. 4

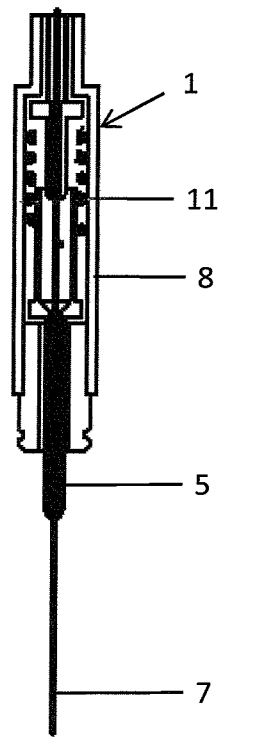
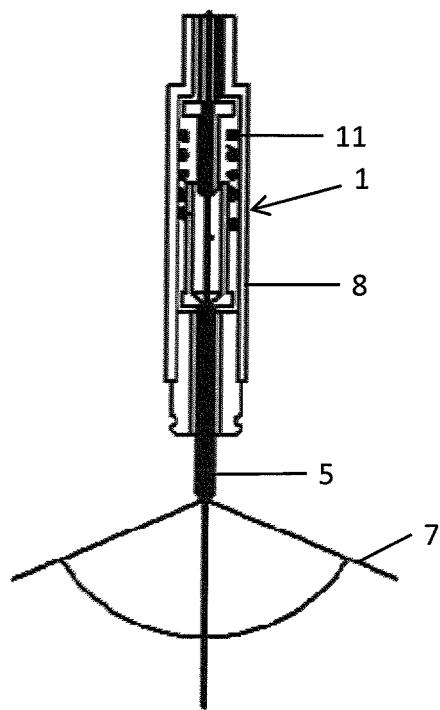
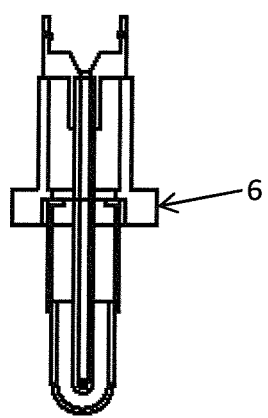
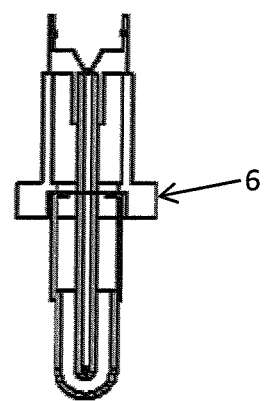
Fig. 5  Fig. 6

SENSOR ARRANGEMENT FOR THE MEASURING OF PARAMETERS IN MELTED MATERIAL

CROSS-REFERENCE TO RELATED APPLICATIONS

This application is a Section 371 of International Application No. PCT/EP2012/000303, filed Jan. 24, 2012, which was published in the English language on Aug. 30, 2012, under International Publication No. WO 2012/113498 A1 and the disclosure of which is incorporated herein by reference.

BACKGROUND OF THE INVENTION

The invention relates to a sensor arrangement for the measuring of parameters in melted material, in particular for measuring the temperature, in particular melted metal or cryolite having a melting point above 500° C. Preferably, the sensor arrangement comprises an upper part and a lower part that is detachably arranged on the upper part. Melted metal can be, for example, melted steel or iron.

Similar sensor arrangements are known, inter alia, from German Patent No. DE 44 33 685 C2, which describes a thermocouple to be arranged on a support body. The thermocouple projects into a container in which the cooling temperature of the melted material is being measured. Further sensor arrangements for the measuring of temperatures in melted material are known, inter alia, from German Patent No. DE 103 31 124 B3, wherein glass fibers are used as a sensor element. Moreover, European Patent No. EP 1 034 419 B1 discloses a sensor arrangement which uses a thermocouple, much like German Patent No. DE 44 33 685 C2. Another temperature sensor is known, for example, from Japanese Patent No. JP 07 229 791 A. In this context, a glass fiber is used for the measurement, which receives radiation from the melted material and transmits it to an analytical unit, in which the temperature is determined from the received radiation in a known manner.

BRIEF SUMMARY OF THE INVENTION

An object of the present invention is to improve on the existing devices and to further simplify the operational safety thereof.

The object is met by the features of the independent claim. Advantageous embodiments are specified in the dependent claims. On the one hand, light radiation can be received and transmitted in easy manner for analysis of the temperature (or other parameters, such as content of additives) of a melted material resulting from the radiation, by arranging a tube, which extends coaxial to a longitudinal axis of the lower part, is closed on its end facing away from the upper part, and is open on the other end, on an immersion end of the lower part facing away from the upper part; by arranging a guide tube, which extends coaxial to a longitudinal axis of the upper part and is open on both ends, in a guide sleeve so as to be mobile (in particular in a longitudinal direction); by applying a pressure acting in the direction of the lower part to the guide tube by an elastic body, the guide tube touching against the lower part; and by arranging one opening of the guide tube and the open end of the tube of the lower part adjacent to each other and coaxial to the longitudinal axis of the lower part. On the other hand, an optical fiber, which is preferably arranged in the guide tube of the upper part and in the tube of the lower part, may be used very easily for multiple measurement cycles.

The optical fiber that is preferably used for the transmission of light and the ensuing determination of temperature and/or parameters, is generally unwound from a reel and fed through the sensor arrangement to its tip. The optical fiber includes a core made of glass, preferably quartz glass, which is surrounded by a metal jacket, which renders the handling of the glass feasible and serves to prevent, for example, inadvertent breakage of the glass. For this purpose, the core is tightly surrounded by the metal jacket, usually a steel jacket. Such optical fibers are commercially available. For a measurement, the optical fiber is passed through the sensor arrangement into the tip of the tube of the lower part; i.e. is brought up to its closed end. The sensor arrangement is immersed by its immersion end being dipped into the melted material, wherein, in particular, the immersed lower part heats up to a temperature in equilibrium with the melted material. The radiation of the melted material is received by the end of the optical fiber and transmitted for analysis.

When measurements are made in high temperature melted material, such as melted cryolite or steel, the end of the optical fiber exposed to the melted material is damaged by action of the temperature, such that it can usually not be used multiple times for reliable measurements. Therefore, the lower part is separated from the upper part after the measurement, after pulling the sensor arrangement out of the melted material. In this context, the guide tube is pushed out of the upper part through the pressure of the elastic body by a distance which is determined by the arrangement of the guide tube in the upper part, and more specifically by the arrangement of mechanical limit stops. The distance may, for example, be 1-5 cm. In this context, the optical fiber, which was originally pushed out of the upper part up to the tip of the tube of the lower part, is surrounded by the guide tube for the length of the moving distance thereof and is mechanically stabilized. The end of the optical fiber still protruding from the guide tube may then be broken off easily, for example by lateral, mechanical action, that is by bending. Subsequently, there is an undamaged new end of the optical fiber available for a further measurement. For this purpose, a lower part is plugged onto the upper part, the optical fiber is passed through the sensor arrangement into the tip of the tube of the lower part, and the measurement can take place.

In this context, the length of the end of the optical fiber to be broken off is substantially determined by the length of the tube of the lower part and the motion of the guide sleeve taking place due to the pressure of the elastic body. For the optical fiber to be broken off at the fracture site without substantial deformation of the optical fiber, the inner diameter of the guide tube, on the one hand, is large enough for the optical fiber to be advanced smoothly, but, on the other hand, not substantially larger than the outer diameter of the optical fiber, in order to largely prevent the optical fiber from bending at the tip of the guide tube while it is being broken off and to ensure that the cross-section of the optical fiber including the metal jacket at the fracture site remains substantially preserved. In this context, a difference between the two diameters of about 0.5 mm or even less than 0.5 mm has been found to be suitable. The advancement of the guide tube, as described above, is limited by the specific design of the upper part, such that the same can be adapted appropriately and such that as little as possible of the optical fiber is being broken off in order to reduce the cost.

The sensor arrangement is preferably designed such that the elastic body is designed as a helical spring that can be arranged concentrically about the longitudinal axis of the upper part. This results in a uniform pressure acting on the guide tube, such that it cannot get lodged and stuck. The end of the guide tube facing away from the lower part is expediently arranged in a housing that surrounds the elastic element. This effectively prevents damage to the moving mechanism from the outside. The end-face limits of the inside of the housing can determine the spring travel of the elastic body and, thus, the motion of the guide tube.

Advantageously, the elastic element touches against a collar of the guide tube, preferably within the housing, such that a uniform pressure acts on the guide tube. The collar can be designed to also be a circumferential rim having a limit stop side that faces away from the elastic body and is pressed against a limit stop surface of the housing of the upper part when the guide tube is in its extended position. The housing can therefore be designed to be cylindrical in shape about the longitudinal axis of the upper part, wherein its end face facing the lower part includes an opening for the guide tube through which the optical fiber is passed, and wherein the opposite end face includes a further opening for the optical fiber.

Preferably, the upper part and the lower part are connected to each other through one connecting part each. It is preferably in this context that at least one of the connecting parts includes at least one groove and at least the other connecting part includes at least one rim, wherein a rim of the one connecting part and the at least one groove of the other connecting part engage each other. Thus, a type of clip connection can be implemented that can be attained by pressing the two parts (upper part and lower part) against each other and can be detached by a counteracting tensile force. For this purpose, at least one of the connecting parts is formed from an elastic material.

One of the connecting parts is preferably designed to be tube-shaped at its end facing the other connecting part, wherein the tube may also include, in the longitudinal direction, multiple slits in order to provide the elasticity required for the attachment and the detachment, and wherein the tube surrounds the other connecting part at its end facing it. The other connecting part, which is surrounded by the tube-shaped connecting part, can also be designed to be a tube.

Preferably, the connecting part arranged on the lower part of the sensor arrangement comprises an axially-symmetrical cone, whose smaller diameter is arranged adjacent to the open end of the tube of the lower part. By connecting the upper part and the lower part, the end of the cone with the larger diameter can be engaged by the end of the guide tube facing it, which is preferably also designed to be conical, so that it is centered additionally and the advancement of the optical fiber is not hindered by steps or the like.

At least one groove and at least one rim preferably extend about the longitudinal axes of the upper part and the lower part, such that an additional axially-symmetrical guidance and a uniform pressure are provided, and the upper part and the lower part do not get lodged against each other. The guidance of the optical fiber can be improved as such.

Preferably, the end of the lower part facing away from the upper part has a container including an inlet opening for the melted material arranged on it into which projects the closed end of the tube of the lower part. Melted material can be taken up into the container for measuring the liquidus curve. The container is closed at its ends facing away from the lower part and includes an inlet opening that can be arranged on the side or to be facing toward the lower part. It is therefore preferably that the tube of the lower part extends through the inlet opening of the container.

The container is preferably arranged concentrically about the tube of the lower part and includes a closed end at its end facing away from the lower part. The end facing the lower part of the sensor arrangement can be open. However, it is feasible just as well to close both ends and arrange a lateral opening in the jacket surface of the container. Preferably, the container is thermally decoupled from the lower part as much as possible. This can be effected in a manner known to a person skilled in the art through individual fins that are arranged about the longitudinal axis of the container and/or of the lower part and connect the container to the lower part. The better the thermal decoupling, the smaller the total cross-sectional area of the fins.

It is also advantageous that the end of the upper part facing away from the lower part is arranged on a support tube or an immersion lance, such that the sensor arrangement can be immersed in and pulled out of the melted material in a simple manner. In this context, the housing can be directly connected to the immersion lance or the support tube. For this purpose, connectors (so-called contact parts) are sufficiently known, whose contacts are adapted to the respective application, such that in addition to a mechanical connection, electrical and/or optical contacts can be provided. This allows, aside from optical signals, electrical signals, which are obtained, for example, from thermocouples or electrochemical sensors, to be transmitted.

In order to protect the immersion end during the immersion process itself, a protective cap may be provided on the immersion end in a generally known manner, in order to protect the closed end of the tube of the lower part and, if applicable, the container arrangement against mechanical damage during immersion into the melted material.

The scope of the invention further includes an upper part which is configured to be used in a sensor arrangement of the type described above, and a lower part that is configured to be used with an upper part of this type.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 shows a cross section of the sensor arrangement;

FIG. 4 shows a cross-section of the sensor arrangement with an inserted optical fiber;

FIG. 5 shows the sensor arrangement after separation of the upper part from the lower part after the measurement; and FIG. 6 shows the end of the optical fiber being broken off.

DETAILED DESCRIPTION OF THE INVENTION

Figures 1, 2:
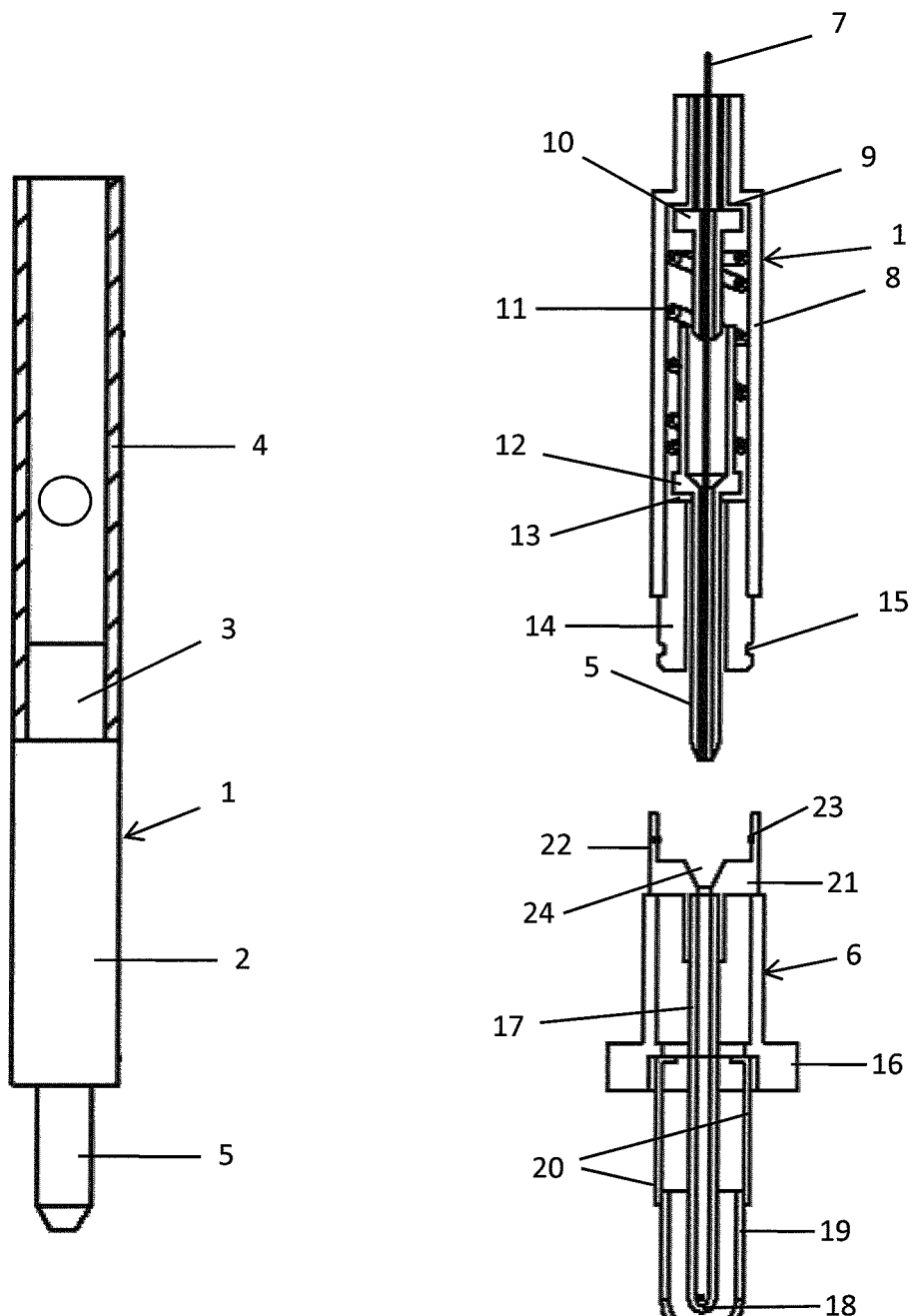
FIG. 1 shows an overview of an immersion lance.
FIG. 2 shows a cross-section through the upper part and the lower part of the sensor arrangement, wherein the two parts are separated.

FIG. 1 shows a schematic overview of the sensor arrangement according to an embodiment of the present invention. The upper part 1 is essentially formed from the contact block 2, which is simultaneously connected to the lance 4 at its end facing away from the immersion end via contact parts 3 and also comprises the housing, at the immersion end of which the guide tube 5 with spring tension applied to it is shown.

FIG. 2 shows a cross-section through the upper part 1 and the lower part 6. The optical fiber 7 projects from the lower part 1 at its upper end, passing through the contact parts. The optical fiber 7 is guided off of a roller through the lance 4 and into the inside of the lower part 6. The upper part 1 is designed to a large extent as a type of housing, which forms a hollow space for accommodating a section of the optical fiber, of the one end of the guide tube 5, and of a helical spring 11.

The housing 8 is formed from a steel jacket having a circumferential abutment 10 on its upper end face 9 for the upper end of the helical spring 11. The lower end of the helical spring 11 presses against a limit stop 12 of the guide tube 5, such that the guide tube 5, in the status of the arrangement shown (i.e. with the connection between the upper part 1 and the lower part 6 being detached), is situated in its pushed-out position, wherein the process of pushing-out is limited by limit stop 12, which touches against the lower end face 13 of the housing that is arranged in the housing. The lower end face 13 is provided by the upper limit of the connecting part 14 of the upper part 1 in the exemplary embodiment shown. At its opposite end, the connecting part 14 comprises a circumferential groove 15.

The lower part 6 comprises a body 16 made of ceramic material. The tube 17, which is closed at its immersion end 18, extends through the body 16. At the immersion end 18, the tube is surrounded by a sample container 19 that is connected to the body by fins 20. At the end of the lower part 6 facing away from the immersion end, a connecting part 21 is arranged on the lower part 6 and can be plugged at its tube-shaped end 22 onto the connecting part 14 of the upper part 1. For this purpose, a circumferential rim 23, which engages the circumferential groove 15 in the assembled state, is arranged on the inside of the tubular end 22.

The connecting part 21 comprises a coaxial cone 24, whose end having the smaller diameter touches against the open end of the tube 17 and which can accommodate, by its larger end, the end of the guide tube 5 that is also designed to be conical. The tube 17 can be formed from copper or steel or quartz glass. The container 19 and the fins 20 can be formed from steel. The container 19 can have a volume of approximately 4 cm$^3$, a height of approximately 28 mm, and an inner diameter of approximately 14 mm.

FIG. 3 shows the lower part 6 plugged onto the upper part 1, wherein the end of the guide tube 5 facing the immersion end is pushed into the housing 8 of the upper part 1. The helical spring 11 is compressed during this process. During the process of telescoping the upper part 1 and the lower part 6; i.e., when the helical spring 11 is being compressed, the end of the optical fiber 7 facing the immersion end of the sensor arrangement is pushed a few millimeters into the tube 17. If the melted material has reached a temperature (radiation) of approximately 350° C. to 800° C., for example 500° C., while the sensor arrangement is being immersed, the lance 4 can be made to vibrate in a generally known manner, wherein the vibration may be started automatically once the defined temperature is reached. The vibration may be used for automatic feed of the optical fiber 7 into the tube 17. For the measurement to be made, the optical fiber is 7 fed in a trailing manner up to the closed immersion end 18 of the tube 17. It protrudes by approximately 60 mm from the guide tube 5 of the upper part 1 in this context. The assembled arrangement is shown in FIGS. 3 and/or 4, wherein FIG. 4 shows the advanced optical fiber 7.

Using the arrangement shown in FIG. 4, a sampling in the sample container 19 follows after the sensor arrangement is immersed into the melted material. Then, the sensor arrangement is pulled from the melted material and the cooling curve can be determined by the optical fiber. During this process, the sensor arrangement 4 can be exposed to a vibration by the lance in a generally known manner. Of course, it is also feasible well to measure just the temperature of the melted material. A container is not required in this context. The radiation emitted by the melted material is detected by the optical fiber and transmitted to a detector. The temperature is determined from the radiation in a known manner.

FIGS. 5 and 6 show the sensor arrangement after the measurement. The upper part 1 and the lower part 6 have been separated to replace a lower part 6 that was spent during the measurement with a new one. By separating the lower part 6 from the upper part 1, the pressure on the helical spring 11 diminishes, such that the guide tube 5 is pushed out of the housing 8 by approximately 2 cm. The positioning of the optical fiber 7 does not change during this process, such that the end of the optical fiber 7 protruding from the guide tube 5 is shortened by the guide tube 5 being advanced. Subsequently, the end of the optical fiber 7, which projects from the guide tube 5 and is now shortened by the advancement of the guide tube, is broken off manually by a rocking motion on the tip of the guide tube 5.

The structural integrity of the broken-off end of the optical fiber 7 was damaged, at least partially, during the measuring process, such that it is no longer usable for another measurement. The advancement mechanism for the guide tube 5 minimizes the end of the optical fiber 7 to be broken off, such that as little as possible of the intact part of the optical fiber is discarded.

Then, a new lower part 6 can be plugged onto the upper part 1 and a new measurement can be taken.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sensor arrangement for the measuring of parameters in melted materials comprising:
   an upper part and a lower part that is detachably arranged on the upper part;
   a tube which extends coaxial to a longitudinal axis of the lower part, the tube being closed on its end facing away from the upper part, open on its other end, and arranged on an immersion end of the lower part facing away from the upper part;
   a guide tube which extends coaxial to a longitudinal axis of the upper part, the guide tube being open on both ends and arranged in a guide sleeve so as to be mobile; and
   an elastic body arranged in the upper part and configured to apply pressure in the direction of the lower part to the guide tube such that the guide tube touches against the lower part,
   wherein the upper part comprises a housing surrounding the elastic body and the open end of the guide tube facing away from the lower part is arranged in the housing, and
   wherein one open end of the guide tube and the open end of the tube of the lower part are arranged adjacent to each other and coaxial to the longitudinal axis of the lower part.

2. The sensor arrangement according to claim 1, wherein the elastic body is provided as a helical spring that is arranged concentrically about the longitudinal axis of the upper part.

3. The sensor arrangement according to claim 1, further comprising a collar provided at one of the open ends of the guide tube, wherein the elastic body presses against the collar.

4. The sensor arrangement according to claim 1, wherein the upper part and the lower part are connected to each other through one connecting part each.

5. The sensor arrangement according to claim 4, wherein at least one of the connecting parts comprises at least one groove and at least the other connecting part comprises at least one rim, and wherein the at least one rim of the one connecting part and the at least one groove of the other connecting part engage each other.

6. The sensor arrangement according to claim 5, wherein the at least one groove and the at least one rim are arranged to extend about the longitudinal axes of the upper part and the lower part.

7. The sensor arrangement according to claim 1, wherein an optical fiber is arranged in the guide tube of the upper part and the tube of the lower part.

8. The sensor arrangement according to claim 1, wherein the end of the lower part facing away from the upper part has a container comprising an inlet opening for the melted material arranged on it, the closed end of the tube of the lower part projecting into the inlet opening.

9. The sensor arrangement according to claim 8, wherein the tube of the lower part extends through the inlet opening of the container.

10. The sensor arrangement according to claim 1, further comprising an immersion lance, wherein one end of the upper part facing away from the lower part is arranged on the immersion lance.

11. A sensor arrangement for the measuring of parameters in melted materials comprising:
an upper part and a lower part that is detachably arranged on the upper part, the upper part and the lower part being connected to each other through one connecting part each, at least one of the connecting parts comprising at least one groove and at least the other connecting part comprising at least one rim, the at least one rim and the at least one groove being configured to engage each other;
a tube which extends coaxial to a longitudinal axis of the lower part, the tube being closed on its end facing away from the upper part, open on its other end, and arranged on an immersion end of the lower part facing away from the upper part;
a guide tube which extends coaxial to a longitudinal axis of the upper part, the guide tube being open on both ends and arranged in a guide sleeve so as to be mobile; and
an elastic body arranged in the upper part and configured to apply pressure in the direction of the lower part to the guide tube such that the guide tube touches against the lower part,
wherein one of the open ends of the guide tube and the open end of the tube of the lower part are arranged adjacent to each other and coaxial to the longitudinal axis of the lower part.

12. The sensor arrangement according to claim 11, wherein the elastic body is provided as a helical spring that is arranged concentrically about the longitudinal axis of the upper part.

13. The sensor arrangement according to claim 11, wherein the upper part comprises a housing surrounding the elastic body and the open end of the guide tube facing away from the lower part is arranged in the housing.

14. The sensor arrangement according to claim 11, further comprising a collar provided at one of the open ends of the guide tube, wherein the elastic body presses against the collar.

15. The sensor arrangement according to claim 11, wherein the at least one groove and the at least one rim are arranged to extend about the longitudinal axes of the upper part and the lower part.

16. The sensor arrangement according to claim 11, wherein an optical fiber is arranged in the guide tube of the upper part and the tube of the lower part.

17. The sensor arrangement according to claim 11, wherein the end of the lower part facing away from the upper part has a container comprising an inlet opening for the melted material arranged on it, the closed end of the tube of the lower part projecting into the inlet opening.

18. The sensor arrangement according to claim 17, wherein the tube of the lower part extends through the inlet opening of the container.

19. The sensor arrangement according to claim 11, further comprising an immersion lance, wherein an end of the upper part facing away from the lower part is arranged on the immersion lance.

* * * * *